June 6, 1950 J. L. ENTWISTLE 2,510,743
TESTING UNIT FOR WIRE SPARKERS
Filed March 19, 1945 3 Sheets-Sheet 2

INVENTOR.
James L. Entwistle
BY
his att'y

June 6, 1950  J. L. ENTWISTLE  2,510,743
TESTING UNIT FOR WIRE SPARKERS
Filed March 19, 1945  3 Sheets-Sheet 3

INVENTOR.
James L. Entwistle
BY

Patented June 6, 1950

2,510,743

UNITED STATES PATENT OFFICE 2,510,743

TESTING UNIT FOR WIRE SPARKERS

James L. Entwistle, Cranston, R. I., assignor to James L. Entwistle Co., Pawtucket, R. I., a partnership consisting of Margherita C. Entwistle and James L. Entwistle Application March 19, 1945, Serial No. 583,607

2 Claims. (Cl. 175—183)

1

This invention relates to new and useful improvements in testing units for wire sparkers.

Wire sparkers are devices for producing a high voltage in a circuit arranged for testing the insulation of wire and cable and are provided with means for detecting an increase of the current in the circuit which occurs when the insulation is faulty. The detecting means may be in the form of a relay, a carbon gap, or the like, which is connected in the primary or secondary circuit of a transformer through which the high voltage is applied.

The object of the invention is to provide a unitary, portable device by means of which one may test the speed of operation as well as the sensitivity of the fault detection device in the sparker.

I shall now describe a preferred embodiment of the invention with the aid of the drawings in which.

Figure 1:
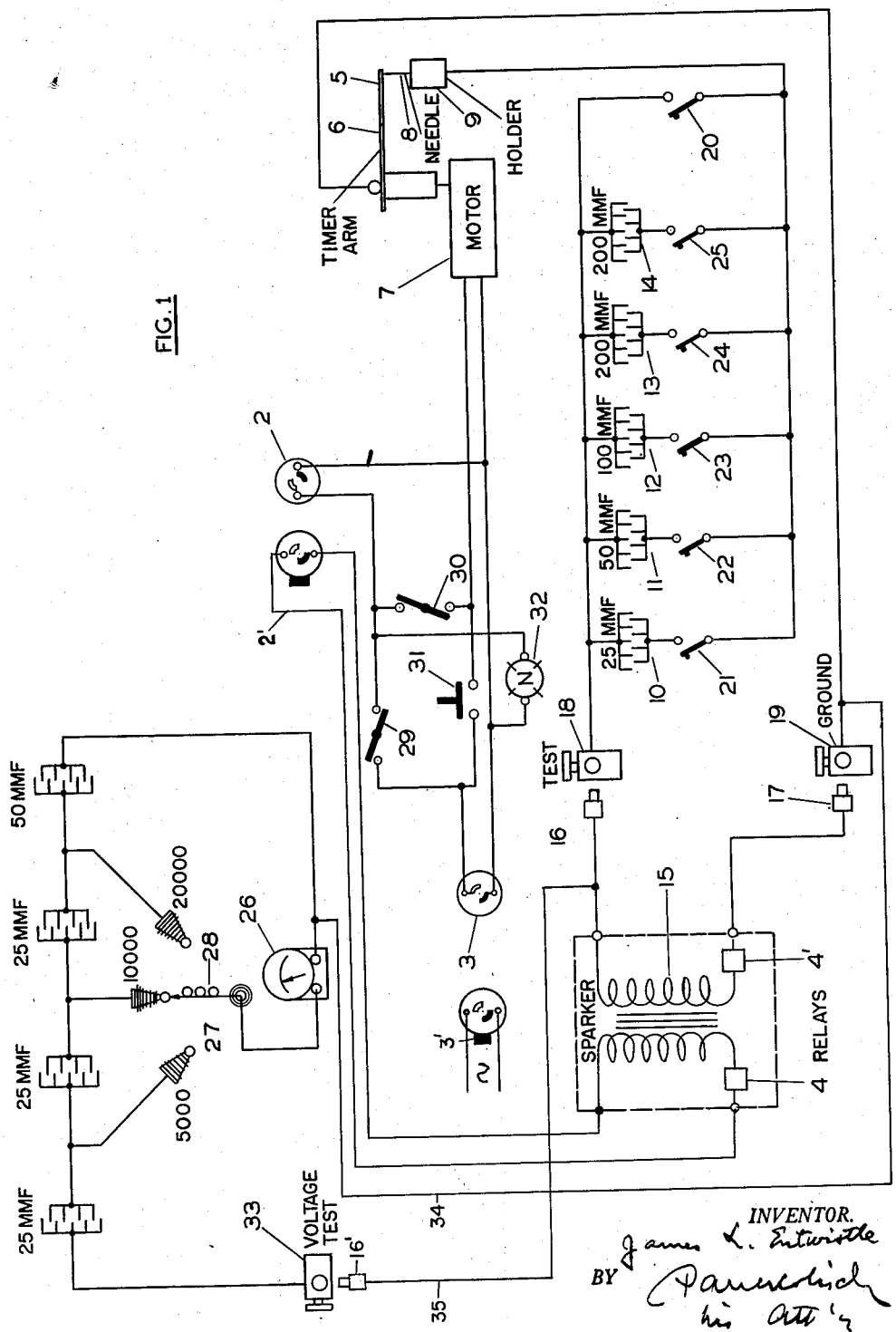
Fig. 1 is a circuit diagram illustrating the testing unit and as much of a sparker as is necessary for the understanding of the invention.

The entire testing unit is assembled within a portable box 1. In the lower left-hand corner of Fig. 1 the transformer of the sparker is diagrammatically illustrated within the dotted lines in order to show the relays 4 and 4' of the sparker which it is desired to test by the testing unit. The testing unit may be connected to a suitable A. C. source, e. g. 110 volt, 60 cycle current at receptacle 3 by means of a suitable cord 3', and by another suitable cord 2' the sparker may be connected to the sparker supply jacket or receptacle 2.

As above stated, the object is to test the speed of response and sensitivity of fault-detecting means like fault relays 4 and 4' in the sparker.

The speed of response of the relay is tested by means of a timer strip 5 of brass or the like, removably mounted on a timer arm 6 and adapted to be rotated by a motor 7, so as to move past a stationary timer needle 8, which is mounted in a needle holder 9. The timer 5 and the needle 8 form a spark gap which, owing to the fact that the needle 8 and holder 9 are vertically movable, may be adjusted to the proper value for the voltage at which the sparker is to be tested. Timer strips 5 of different widths are provided so as to permit the varying of the time factor; i. e. the time during which the strip 5 is directly over the needle point 8. The speed of movement of the

2 timer strip being constant, the wider it is, the greater will be the time factor. In general, the gap between the timer strip and the needle is made just under the maximum width at which a spark will jump the gap whenever the brass strip passes the needle.

One purpose of the gap is more definitely to limit the time factor. If the gap is too small, then the spark will jump it an appreciable time before the timer strip is directly over the needle and the arcing will continue for some time after the strip has passed the needle.

Another purpose of the gap is to provide a visible indication, the jumping of the spark, that current flows when the timer strip 5 passes the needle 8.

Since the gap is nearly maximum for each testing voltage, a slight variation thereof by the lowering of the needle or by the dulling of its point by arcing, may prevent the gap from breaking down. This is especially true if extremely short timing intervals are used, because then the gap may fail also on account of the passage of the timer strip past the needle at a time when the A. C. voltage is not at its peak value.

It is important, therefore, in the testing of a wire sparker that the test be disregarded if no spark is seen to jump the gap, because the absence of the spark indicates that no current flowed in the fault location circuit.

The sensitivity of the fault relay circuit is tested by inserting one or more impedances, e. g., condensers 10, 11, 12, 13 and 14, in series with the secondary 15 or testing circuit of the sparker. The secondary winding 15 is connected through plugs 16 and 17 to binding posts 18 and 19 of the test unit. The binding post 18 may be connected with needle 8 through a switch 20 or through any one or more of the parallel paths including condensers 10–14 by closing one or more of the switches 21, 22, 23, 24 and 25. The condensers function as choke impedances in the circuit which is completed over needle 8, arm 5, binding post 19, plug 17 and the other end of transformer secondary 15, and limit the amount of current which can flow in the testing circuit. This provides an indication of the ability of the sparker to locate capacity or leakage insulation faults as well as complete breakdown faults. The importance of this will be appreciated if it is borne in mind that sparker tests can replace the water test only if they will locate leakage faults as well as complete insulation breakdowns. Heretofore water tests have been the most common way of finding wire insulation leaks, because the varying degrees of dampness and ensuing conductivity imparted to insulation by water was the most satisfactory way of determining leakage of small amounts of current.

The condensers, as indicated in Fig. 1, provide a series of capacitances of 25–575 micro-micro-farads in steps of 25 micro-micro-farads.

When the switch 20 is closed, then one can test the speed of response of relays 4 or 4' on complete insulation breakdown. Such test is used when the fault circuit will not be tripped when switches 21–25 are closed and 20 is open, giving a total of 575 micro-micro-farads of series capacitance in the testing circuit, but will be tripped when switch 20 is closed.

In the upper left-hand corner of Fig. 1, the circuit of the portion of the testing unit used to test the sparker for voltages to which it may be subjected is shown. Ground binding post 19 is common to both portions of the testing unit, as indicated by line 34. When it is desired to test the voltage of the sparker rather than the sensitivity of relays 4 and 4', line 35 and plug 16' are connected to binding post 33 and plug 16 disconnected from binding post 18. This portion of the testing unit is equipped with an electrostatic voltmeter 26 and a voltage divider 27 which allows testing of the sparker voltages up to 20,000 volts. The arm 28 of the voltage divider is connected with the electrostatic voltmeter 26 and it has three scales of 5, 10 and 20,000 volts obtainable, respectively, in the three positions of the arm. In order to prevent damage to the meter 26, the arm should always be left in the 20 kv. position and a reading should always be taken in this position before changing to a lower range on the voltage divider. The sparker should always be turned off when changing the adjustment of the voltage divider range.

The speed of response and sensitivity tests should be carried out at voltages that do not exceed 10 kv. because this is the rated limit of the series condensers. The usual testing voltage is 6 kv.

The unit should be placed close to the sparker, preferably on the high tension side. First, the current supply to the sparker is disconnected and the testing unit is connected to the current supply by plugging in the current mains at 3. The sparker is then connected to the testing unit through the receptacle 2. Next, the ground and test cords are connected to the testing unit. The cords are indicated in Fig. 1 by 16 and 17, which can be plugged into the binding posts 18 and 19. A timing strip 5 of the proper width is selected, and needle 8 is adjusted. The gap between 8 and 5 should be .2" for testing at 6,000 volts and .1" for testing at 3,000 volts. The timer arm 6 is then moved away from the needle about an inch in a counter-clockwise direction.

Sparker switch 29, synchronizing switch 30 and motor push-button 31 are open.

First, the usual sparker control switch (not shown) is turned on, and then sparker switch 29, to energize the sparker. Indicator lamp 32, bridged across the receptacle 2, will now light showing that the sparker is being energized. The sparker test voltage is adjusted by a conventional voltage regulator (not shown) on the sparker to 6,000 or 3,000 volts, depending whether high or low voltage sparkers are used, and the sparker switch 29 is turned off.

Next, certain ones of the condenser switches 21–25, are closed so as to introduce the proper amount of series capacitance in the circuit, usually 150 micro-micro-farads for high sensitivity sparkers when testing at 6,000 volts. The synchronizing switch 30 which insures simultaneous energization of motor and sparker supply is then turned on and the motor push-button 31 is actuated. This will close the circuit of motor 7 and, by holding the push-button 31 down until the timer arm passes the needle point and then immediately releasing, one will notice a spark jumping the gap and the usual indicator lamp (not shown) in the sparker itself will flash if the fault relay operates. The lamp in the sparker is customarily connected to contacts of relays 4 and 4'. If no spark is seen, then the button 31 should be pressed again and held down for two or three revolutions of the timer 5. If still no spark is noticed, then the needle 8 should be brought closer to the timer 5 and the process repeated.

If a spark is noted but the fault relay 4 fails to respond, then this indicates that the sparker fault location circuit is either not sensitive enough or too slow to operate under test conditions.

To determine the sensitivity and the speed at which the fault relay circuit will operate, these tests should be repeated, using first a narrow timer strip 5, then a wider one and finally the widest strip 5 provided. If the fault relay 4 still fails to respond, then the tests should be repeated, using more and more series capacitance each time, until the relay operates. When a series capacitance is reached at which the fault relay operates then, using this capacitance, the tests should be continued, using shorter and shorter time intervals until the relay fails to operate.

For voltage testing, the unit is connected to the current supply and the sparker as outlined above. Plug 16' is inserted into binding post 33, and plug 16 disconnected from binding post 18. The voltage regulator (not shown) on the sparker is a device which determines the amount of voltage to be applied by the sparker when testing a wire, etc., and must be in its lowest position and the synchronizing switch 30 must be open. The voltage divider arm 28 should be moved into the 20 kv. position and the sparker switch 29 closed. The voltage divider should not be changed while power is on the sparker.

The voltage on the sparker is then slowly raised to a value which it is desired to check. The usual procedure is to check the highest value first and then successively lower values. When the voltage is less than 10 kv. then the arm 28 should be moved to the 10 kv. position and, when it is below 5 kv., then to the 5 kv. position.

Figure 2:
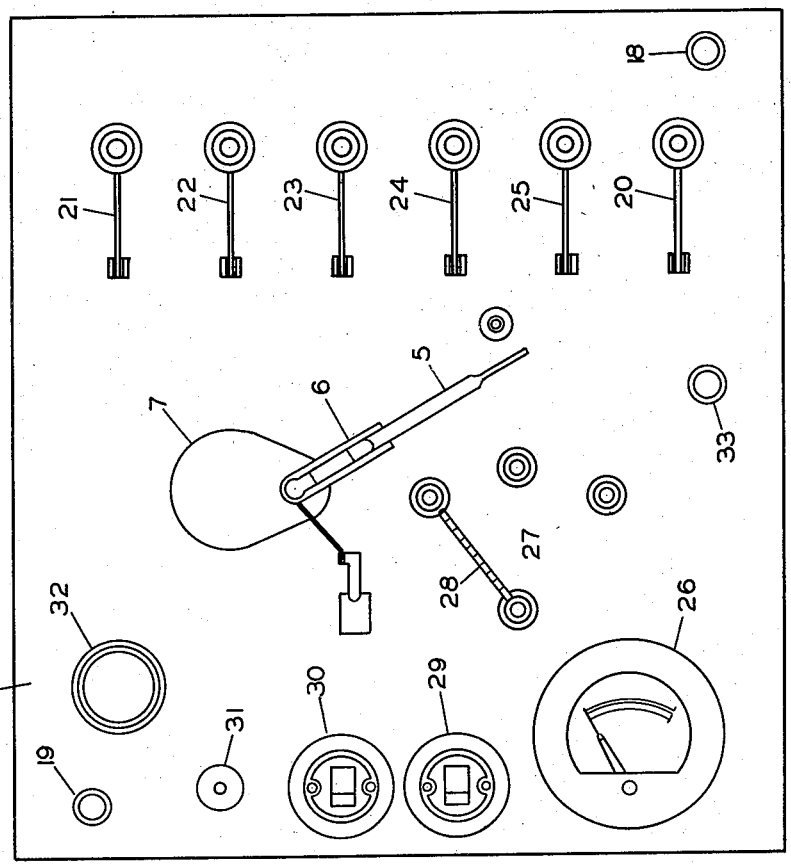
Fig. 2 is a plan view of the testing unit.
Figure 3:
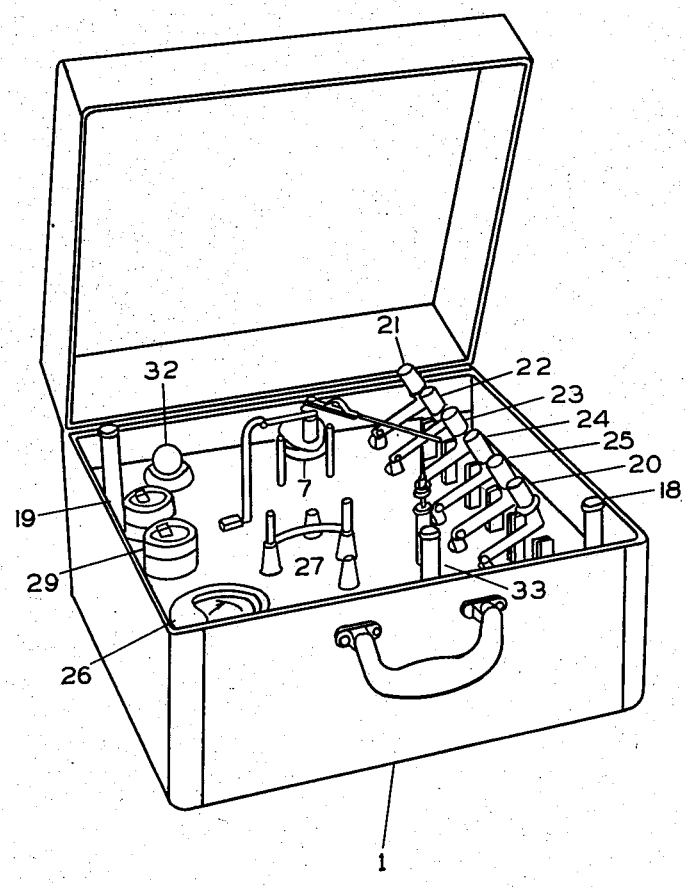
Fig. 3 is an end view of the box containing the testing unit.

The plan view of the testing unit (Fig. 2) and the end view of the box of the testing unit show how arm 28 of voltage divider 27 may be moved into three different positions, depending upon the voltage for which the sparker is being tested. Fig. 3 also shows how switches 21–25 may be operated to vary the capacitance of the circuit as well as the location of the timer with respect to the needle. Figs. 2 and 3 enable one to see how compact and portable the testing unit is.

It will be obvious to those skilled in the art that in addition to the tests above described, there may be other tests to which the sparker must be subjected. The sparker is customarily subjected to a routine test in which the means including the impedances 10–14 and the timing device for causing a predetermined current to flow for a predetermined length of time are adjusted to certain standards, and then the fault-detecting means, such as one or more relays like 4, in the sparker are adjusted until it or they respond to such predetermined standard current.

The potential-indicating means including the voltmeter 26 and switch 27 may be omitted from the testing device and constructed as a separate unit, or its function may be performed by a separate metering device.

What I claim is:

1. An apparatus for testing fault detecting relays of an insulation tester, including a high voltage transformer having at least one winding connected in series with a relay, the testing apparatus comprising an adjustable needle, an arm rotatable with respect to said needle and, when adjacent forming a spark gap therewith, a plurality of impedances of different values, a circuit for the relay including said arm, needle, impedances and transformer in series, and means for connecting any impedance in the relay circuit, whereby the sensitivity of the relay may be tested and the spark across the gap serves as a visual indication that the relay operates.

2. The device according to claim 1, and means for varying the length of time while said arm forms a spark gap with the needle during each rotation, whereby the speed of response of said relay may be tested.

JAMES L. ENTWISTLE.

REFERENCES CITED

The following references are of record in the file of this patent:

UNITED STATES PATENTS

| Number | Name | Date |
| --- | --- | --- |
| 734,369 | Rodde | July 21, 1903 |
| 1,350,334 | Radtke | Aug. 24, 1920 |
| 1,543,277 | Courtier | June 23, 1925 |
| 1,559,161 | Courtier | Oct. 27, 1925 |
| 1,971,196 | McNarry | Aug. 21, 1934 |
| 1,974,275 | Janovitch | Sept. 18, 1934 |
| 2,043,528 | Davis | June 9, 1936 |
| 2,087,783 | Savage | July 20, 1937 |
| 2,400,472 | Strickland | May 14, 1946 |